Dec. 16, 1969　　　F. W. NELSON　　　3,484,266
METHOD OF INTERNALLY COATING TUBULAR MEMBERS WITH GLASS
Filed July 5, 1966

INVENTOR
FORREST W. NELSON
BY
Andrus & Starke
ATTORNEYS

United States Patent Office 3,484,266
Patented Dec. 16, 1969

3,484,266
METHOD OF INTERNALLY COATING TUBULAR MEMBERS WITH GLASS
Forrest W. Nelson, Pewaukee, Wis., assignor to A. O. Smith Corporation, Milwaukee, Wis., a corporation of New York
Filed July 5, 1966, Ser. No. 562,649
Int. Cl. B44c 1/06; B44d 1/12, 1/14
U.S. Cl. 117—18                                                        7 Claims

ABSTRACT OF THE DISCLOSURE

A method of applying a glass coating to the internal surface of a tubular article. A glass ground coat is initially applied to the internal surface of the tubular member and fired at an elevated temperature to fuse the ground coat to the article. Subsequently, the article is cooled to reduce the temperature of the ground coat to a value 200 to 900° below the optimum firing temperature of the ground coat and above the softening temperature of a class cover coat to be subsequently applied over the ground coat. While the ground coat is at this temperature, a dry dust coating of a glass cover coat is applied over the ground coat by an elongated applicator, and at this temperature, the cover coat will soften and flow over the previously applied ground coat. The article is then heated to a firing temperature sufficiently high to fire and mature the cover coat and below the firing temperature of the ground coat.

---

This invention relates to a method of fabricating a glass coated article and more particularly to a method of applying a glass coating to the inner surface of a tubular article.

The pipeline transmission of large volumes of corrosive liquids and gases has established a substantial market for corrosion resistant pipe. Steel pipe lined with glass or vitreous enamel offers the greatest market potential in this area because of its excellent corrosion resistance and low flow resistance. In the past some difficulty has been experienced in successfully applying a glass coating, free from defects such as pinholes, blisters and abrasions, to the inner surface of a length of pipe. This difficulty has been most prevalent in the production of glass lined pipe having a small inner diameter and pipe of moderate to substantial length. The presence of even a few defects in the glass coating will very quickly destroy the effectiveness of the glass coating in a corrosive environment.

In the conventional glass coating operation, a glass slip is sprayed or slushed on the inner surface of the pipe. After drying the coating, the pipe is heated to fire the glass and subsequently cooled in preparation for applying the glass cover coat in a similar manner. This conventional practice requires the cooling and reheating of the pipe which is not only costly but time consuming.

Attempts have been made in the past to try to apply the cover coat frit as a dry dust coat to the heated pipe after firing the ground coat in order to eliminate the steps of cooling and reheating. When attempting to apply a dry dust cover coat to the heated pipe, the glass frit has been applied to the pipe by use of a long lance or applicator which discharges the dry frit on the interior surface of the rotating, heated pipe as the lance is withdrawn through the pipe.

In applying the glass frit to small diameter pipes or pipes of substantial length with a lance or other type of elongated applicator, some degree of sag of the applicator has been found to be unavoidable. Portions of the sagging applicator ultimately come into frictional contact with the soft surface of the previously applied ground coat, with a resultant marring of the glass surface during the application of the cover coat.

The marred surface results in the exposure of portions of the metal of the pipe and the subsequently applied cover coat which comes into contact with the exposed metal areas generally develops surface defects, such as blisters and pits, during the firing phase of the cover coat. These defects in the cover coat result in a rapid deterioration of the pipe adjacent the defective areas when the pipe is subjected to a corrosive environment.

It has been proposed in the copending application of the same inventor, Ser. No. 246,735, filed Dec. 24, 1962, to employ a specialized ground coat which is relatively hard and nonsticky at the furnace temperature. As this specialized ground coat is relatively hard, the lance or glass coating applicator can be moved across the surface of the ground coat without marring the same during the application of the cover coat. The present invention takes a different approach by applying a conventional glass ground coat and subsequently chilling the ground coat to a temperature of 200° F. to 900° F. below the optimum firing temperature of the ground coat. At this temperature the previously applied ground coat is somewhat soft and deformable but tough enough to support the applicator without marring.

More specifically the bare metal pipe is heated in a furnace and when the temperature of the pipe is in the neighborhood of 900° to 1600° F. a conventional glass ground coat is applied to the inner surface of the pipe by a lance or other applicator. Heating of the pipe is continued to a temperature in the range of 1500° to 1750° F. and the pipe is maintained at this temperature for a period of about 10 minutes to fuse the ground coat. The temperature is then adjusted until the ground coat is at a temperature in the range of 200° F. to 900° F. below the optimum firing temperature of the ground coat. Every glass composition fires out within a given temperature range, and the optimum firing temperature is defined as the midpoint of that range. The temperature to which the ground coat is cooled is in the range of 800° to 1500° F. depending on the glass composition, and preferably in the range of 1200° to 1400° F. At this temperature the ground coat is relatively hard and tough so that it will support the lance or applicator without marring.

The lance is then inserted within the glass coated pipe and the cover coat is then applied over the ground coat. Following the application of the cover coat the temperature is increased to about 1400° to 1650° F. and as the pipe is heated to this temperature the glass frit will melt and roll out on the internal surface of the pipe. The pipe is maintained at this temperature for a period of about 10 minutes to fuse the cover coat to the ground coat and provide a uniform, corrosion resistance internal glass coating.

The present invention is particularly adaptable for coating the internal surfaces of relatively long, small diameter pipe or tubes. Conventional ground coats and cover coats are applied by a noncantilevered lance, and by chilling the ground coat to a specific temperature below the optimum firing temperature and at which the ground coat is relatively hard and nonmarrable, the cover coat can be successfully applied to produce a uniform defect-free coating.

Other objects and advantages will appear in the course of the following description.

The drawings illustrate the best mode presently contemplated of carrying out the invention.

In the drawings:
FIGURE 1 is a longitudinal section of an apparatus employed to apply a glass coating to the internal surface of a pipe;

Figure 1:
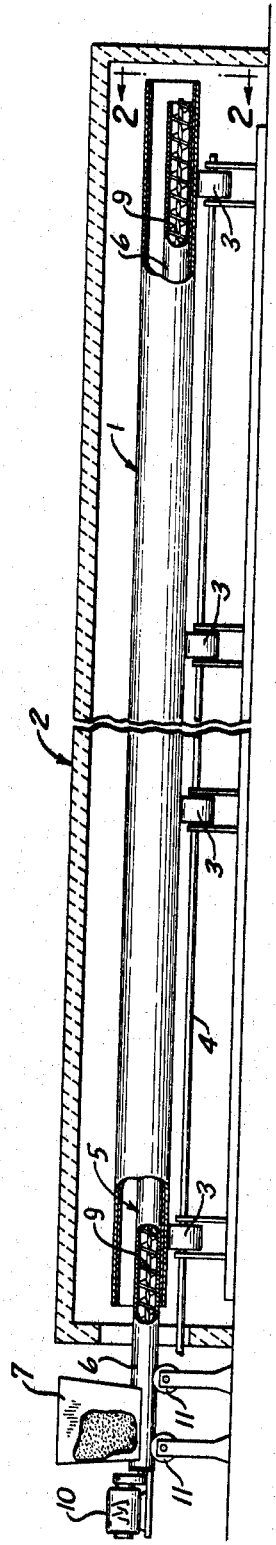
Figure 2:
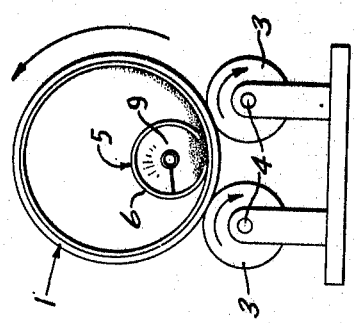
FIG. 2 is a transverse section taken along lines 2—2 of FIG. 1.

FIGS. 1 and 2 illustrate an apparatus for applying a glass coating to the internal surface of a relatively small diameter pipe or tube 1. The pipe 1 is positioned within a gas fired furnace 2, although other suitable heating means such as induction or resistance heating may be employed. The pipe is supported on a series of rollers 3 driven by a shaft 4 which is connected to a suitable drive means, not shown. By driving rollers 3 at a predetermined speed the pipe 1 can be rotated during the application and maturation of the glass coating. The rotation will insure uniform distribution of the glass on the pipe, resulting in a continuous, uninterrupted glass surface, and the rotation will also maintain the heated pipe in a relatively straight condition during the firing phase.

Both the glass ground coat and the cover coat are applied to the interior surface of the pipe 1 by a lance or applicator 5 which is movable longitudinally within the pipe 1. The lance 5 includes a tube 6, and a hopper 7 which contains a quantity of powdered or finely divided glass frit is connected to one end of the tube. An auger 9 is located within the tube and is driven by a motor 10. Rotation of the auger serves to convey the glass frit from the hopper 7 and discharge the frit from the free end of tube 6.

In the process of the invention, the pipe to be coated is initially treated to remove scale and deposits which result from the pipe manufacturing process and from atmospheric oxidation of the metal. The surface treatment is usually accomplished by sand or grit blasting the inner pipe surface utilizing conventional abrasive cleaning equipment.

After cleaning, the pipe is positioned on the rollers 3 in the furnace and continuously rotated. Hopper 7 is filled with the glass frit ground coat and the lance is then inserted within the pipe, with the assistance of insertion and withdrawal rollers 11, to a position where the free end of the lance projects slightly beyond the corresponding end of the pipe 1. In some cases where the pipe is relatively long, a lance can be inserted in each end of the pipe and the free end of the lance will then extend slightly beyond the midpoint of the length of the pipe to provide a slight overlap of the coating applied by each lance. The pipe is heated within the furnace 2 and when the temperature of the pipe reaches a value about 200° to 900° F. below the optimum firing temperature of the glass frit ground coat, generally about 900° to 1400° F., the auger 9 is operated and the lance is moved longitudinally within the pipe to thereby apply the glass frit ground coat powder to the internal surface of the pipe. Heating of the pipe is continued and the frit will soften and the rotation of the pipe will distribute the melting glass over the entire internal surface of the pipe in the form of a smooth uninterrupted coating.

The glass coated pipe is maintained at the firing temperature of 1500° to 1750° F. depending on the glass composition for a period of about 5 to 15 minutes, and preferably about 10 minutes, to mature or fire the ground coat.

As the ground coat at this time is relatively soft the lance 5 cannot be reinserted within the pipe 1 to apply the cover coat without marring the surface of the ground coat. To avoid contact of the lance with the ground coat, attempts have been made in the past to employ cantilevered lances or applicators which remain centered with respect to the pipe throughout their length. However, in pipe lengths of 20 to 30 feet or greater and shorter lengths of relatively small diameter pipe, the applicators inevitably develop a substantial degree of sag even when cantilevered. Thus, the applicator, due to the sagging tendency, invariably establishes frictional contact with the previously applied ground coat in varying degrees, depending on the pipe length and diameter. The contact of the lance with the previously applied ground coat will mar or disrupt the ground coat, exposing the bare metal, and this will result in defects in the cover coat if applied directly to the exposed metal.

In accordance with the invention, after maturing of the ground coat, the glass coated pipe is chilled to a temperature at which the ground coat will be relatively hard and capable of supporting the lance 5. This temperature is in the range of 200° to 900° F. below the optimum firing temperature of the ground coat. Depending on glass composition, this temperature will generally be in the range of about 800° to 1500° F. and for most glasses 1200° to 1400° F. with a temperature of about 1250° F. being preferred. At this temperature the ground coat is relatively hard but yet is not completely fused and solidified. The lance 5 is then moved inwardly over the ground coat and as the ground coat is relatively hard the lance will not mar the surface of the ground coat. After the lance has been inserted within the pipe, the auger 9 is operated and the lance is simultaneously withdrawn to apply the glass frit cover coat to the internal surface of the pipe. As the glass ground coat on the pipe is at a temperature about the softening temperature of the cover coat, or is approaching the softening temperature by virtue of the continued heating of the pipe, the cover coat will soften and the melting glass will roll out on the internal surface of the pipe.

Heating of the glass coated pipe is continued until the maturing or firing temperature of the cover coat is reached. The firing temperature is generally in the range of about 1400° to 1650° F. with the specific optimum firing temperature depending on the glass composition. The firing temperature is below the maturation or firing temperature of the ground coat so that the ground coat will not be disturbed by the firing of the cover coat. The cover coat is generally fired at this temperature for a period of 5 to 15 minutes and preferably about 10 minutes.

The composition of the glass ground coat is not particularly critical and can be any conventional type having a softening point in the range of 200° to 900° F. below the optimum firing temperature of the ground coat. It has been found that a ground coat frit having the following formulation can be successfully employed:

|  | General Composition | Specific Formulation 1 | 2 |
|---|---|---|---|
| $SiO_2$ | 35-75 | 39 | 70 |
| $TiO_2$ | 0-10 | 2 | 0 |
| $ZrO_2$ | 0-10 | 4 | 4 |
| $B_2O_3$ | 3-25 | 16 | 5 |
| $CaO$ | 0-8 | 5 | 0 |
| $Li_2O$ | 0-7 | 2 | 2 |
| $Na_2O$ | 8-18 | 10 | 11 |
| $K_2O$ | 0-10 |  | 2 |
| $CoO$ | 0.3-1.5 | .75 | 1.0 |
| $MgO$ | 0-5 | 3 | .1 |
| $NiO$ | 0-1.5 | .75 | .50 |
| $MnO_2$ | 0-1.5 | .50 | .50 |
| $Al_2O_3$ | 0-15 | 12 |  |
| $BaO$ | 0-5 | 5 | 3 |

The glass cover coat is also a conventional type, preferably one with good acid resistance, and may have the following composition in weight percent:

|  | General Composition | Specific Formulation 1 | 2 |
|---|---|---|---|
| $SiO_2$ | 50-75 | 56 | 68 |
| $TiO_2$ | 0-18 | 8 | 2 |
| $ZrO_2$ | 0-5 | 0 | 4 |
| $CaO$ | 0-10 | 3 | 0 |
| $B_2O_3$ | 5-12 | 10 | 7 |
| $Li_2O$ | 0-4 | 0 | 2 |
| $Na_2O$ | 10-18 | 12 | 12 |
| $K_2O$ | 0-8 | 4 | 1 |
| $CoO$ | 0-1.5 | 0 | 1.5 |
| $MgO$ | 0-6 | 2 | 0 |
| $NiO$ | 0-1.5 | 0 | .25 |
| $MnO_2$ | 0-1.5 | 0 | 1.21 |
| $Al_2O_3$ | 0-12 | 5 | 0 |
| $BaO$ | 0-8 | 0 | 5 |

While the above description was directed to the application of a ground coat and a single cover coat, it is contemplated that additional cover coats can be applied, if desired, in a similar manner. After the firing of each cover coat, the temperature of the glass coating is adjusted to a value of 200° to 900° F. below the optimum firing temperature of the previously applied glass coating and while at this temperature, the succeeding cover coat can be applied in the manner previously described.

Figure 3:
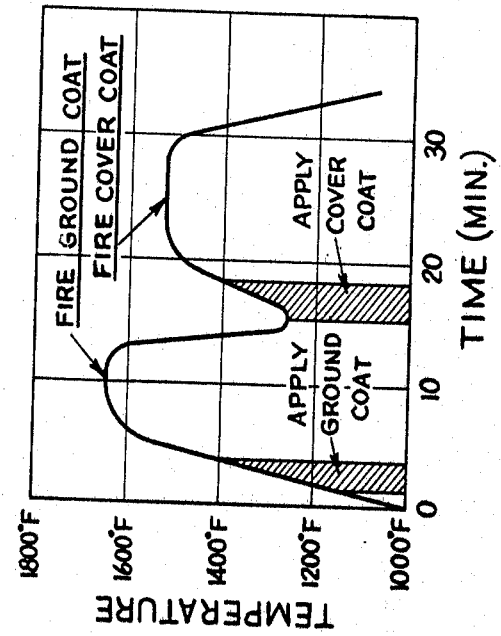
FIG. 3 is a time-temperature graph illustrating the heating cycle for a specific glass ground coat and cover coat.

The time-temperature graph shown in FIG. 3 illustrates the process of the invention as applied to a specific glass formulation. As shown in FIG. 3, the pipe 1 was heated and the ground coat was applied as the temperature of the pipe ascended through the range of about 1150° F. to 1400° F. Heating was continued to a temperature of 1640° F. and the pipe was maintained at this temperature for a period of 10 minutes to fire or mature the ground coat. Subsequently the pipe was cooled by passing air through the furnace until the temperature of the ground coat was 1250° F. or 390° F. below the firing temperature of the ground coat. When this temperature was reached, reheating began and the cover coat was applied as the temperature rose through the range of about 1250° F. to 1400° F. Heating continued until the temperature reached 1540° F. and the pipe was held at this temperature for a period of 10 minutes to mature or fire the cover coat. After firing, the pipe was air cooled to room temperature.

By the method of the invention the internal surface of relatively long, small diameter pipes or tubes are coated with a conventional glass ground coat and cover coat using a noncantilevered lance by cooling the ground coat after firing to a temperature at which the ground coat is relatively hard and nonmarrable and yet is above, or slightly below, the softening point of the cover. By applying the cover coat when the ground coat is at this specific temperature range, the ground coat will not be disturbed and a uniform defect-free glass coating will be produced.

I claim:

1. A method of applying a glass coating to the internal surface of a tubular article, comprising the steps of applying a glass ground coat to the internal surface of the tubular member, heating the ground coat to a first temperature sufficient to fire and mature the ground coat, adjusting the temperature of the glass ground coat to a second valve 200° to 900° F. below the optimum firing temperature of said glass ground coat, and above the softening temperature of a glass cover coat to be subsequently applied over said ground coat, the ground coat at said second temperature being relatively hard and nonmarrable, rotating the pipe about the axis thereof, inserting an applicator into said tubular member while said ground coat is at said second temperature with at least a portion of said applicator being in contact with said ground coat, discharging a glass cover coat composition from said applicator on the previously applied ground coat while said ground coat is at said second temperature, said glass cover coat composition melting and being distributed over said ground coat as a uniform cover coat, heating the glass coated tubular member to a third temperature sufficiently high to fire and mature the cover coat and below said first temperature, and subsequently cooling the glass coated tubular member to room temperature.

2. The method of claim 1 in which said first temperature is in the range of 1500° to 1750° F. and said second temperature is in the range of 800° to 1500° F.

3. The method of claim 1 in which said glass ground coat and said glass cover coat are applied in the form of dry powdered frit.

4. The method of claim 2 in which said third temperature is in the range of 1400° to 1650° F.

5. A method of applying a glass coating to the internal surface of the tubular member, comprising the steps of rotating the tubular member about its axis, heating the tubular member, inserting an elongated applicator containing finely divided glass ground coat frit into the tubular member with said glass distributing applicator being in physical contact with the internal surface of said tubular member, discharging a glass frit ground coat from the applicator when the pipe is at a first temperature 200° to 900° F. below the optimum firing temperature of said ground coat frit while moving said applicator longitudinally within said tubular member to thereby apply said ground coat frit to the internal surface of the tubular member, heating said glass coated tubular member to a second temperature in the range of 1500° to 1750° to fire said ground coat, adjusting the temperature of the glass coated tubular member to a third temperature 200° to 900° F. below said optimum firing temperature and at which the ground coat is relatively hard and will not mar, said third temperature being above the softening temperature of a glass cover coat to be subsequently applied over said ground coat, inserting said applicator containing finely divided glass cover coat frit into said tubular member with said applicator being in physical contact with said ground coat, discharging glass cover coat frit from the applicator while withdrawing the applicator through said tubular member to thereby deposit the cover coat frit on the ground coat while the ground coat is at said third temperature to melt said cover coat, heating the glass coated tubular member to a fourth temperature in the range of 1400° to 1650° F. to thereby fuse said cover coat, said fourth temperature being below said second temperature, and cooling the glass coated member to room temperature.

6. The method of claim 5 in which the third temperature is in the range of 800° to 1500° F.

7. The method of claim 5, in which the third temperature is in the range of 1200° to 1400° F.

References Cited

UNITED STATES PATENTS

| | | | |
|---|---|---|---|
| 2,477,121 | 7/1949 | Ganci | 117—23 X |
| 2,708,172 | 5/1955 | Robson et al. | |
| 2,786,782 | 3/1957 | Zimmerman | 117—129 X |
| 2,877,144 | 3/1959 | Iversen | 117—70 X |
| 2,894,224 | 7/1959 | Iversen | 117—70 X |
| 3,062,685 | 11/1962 | Sanford et al. | 117—129 |
| 3,207,618 | 9/1965 | De Hart | 117—18 |

WILLIAM D. MARTIN, Primary Examiner

PAUL ATTAGUILE, Assistant Examiner

U.S. Cl. X.R.

117—23, 53, 70, 97

PO-1050
(5/69)

UNITED STATES PATENT OFFICE
CERTIFICATE OF CORRECTION

Patent No. 3,484,266            Dated December 16, 1969

Inventor(s) Forrest W. Nelson

It is certified that error appears in the above-identified patent and that said Letters Patent are hereby corrected as shown below:

Col. 4     Line 73     Cancel "1.21" and substitute therefor ---1.25---

Col. 4     Line 75     Cancel "5" and substitute therefor ---1---

Col. 5     Line 47     Cancel "valve" and substitute therefor ---value---

SIGNED AND
SEALED
JUN 23 1970

(SEAL)
Attest:

Edward M. Fletcher, Jr.
Attesting Officer

WILLIAM E. SCHUYLER, JR.
Commissioner of Patents